United States Patent [19]

Gutkowski

[11] 3,901,262
[45] Aug. 26, 1975

[54] FLUID CONDITIONER HOUSINGS
[76] Inventor: Janusz Gutkowski, 7 Rufus Close, Lewes, Sussex, England
[22] Filed: Jan. 24, 1974
[21] Appl. No.: 437,074

[30] Foreign Application Priority Data
Jan. 25, 1973   United Kingdom............... 3753/73

[52] U.S. Cl. ........ 137/101.11; 137/268; 137/205.5; 239/310; 239/317
[51] Int. Cl............................................. B01f 1/00
[58] Field of Search............ 137/101.11, 268, 205.5, 137/564.5; 184/55 A; 222/133, 165; 239/310, 311, 312, 313, 314, 315, 316, 317, 318

[56] References Cited
UNITED STATES PATENTS
2,730,269   1/1956   Earle et al. ................... 184/55 A X
3,091,402   5/1963   Palmer........................... 239/317 X
3,421,738   1/1969   Dulger........................... 239/317 X
3,455,054   7/1969   Tibbals, Jr. .................... 137/268 X
3,759,284   9/1973   Crowley et al.................. 239/310 X
3,770,205   11/1973  Proctor et al.................... 239/317

*Primary Examiner*—William R. Cline

[57] ABSTRACT

This invention relates to a fluid treatment apparatus in which fluid passes out of a pipe line and through a fluid treatment device and back into the pipe line. In order to remove and replace the fluid treatment device it is mounted in a container that swings around the axis of the pipe line to a servicing position. The container has a lip engaged by a resilient ring which expands as it moves to the servicing position to allow the container with its lip to be removed from the ring. In the normal operating position the ring makes a fluid tight connection with the lip.

3 Claims, 12 Drawing Figures

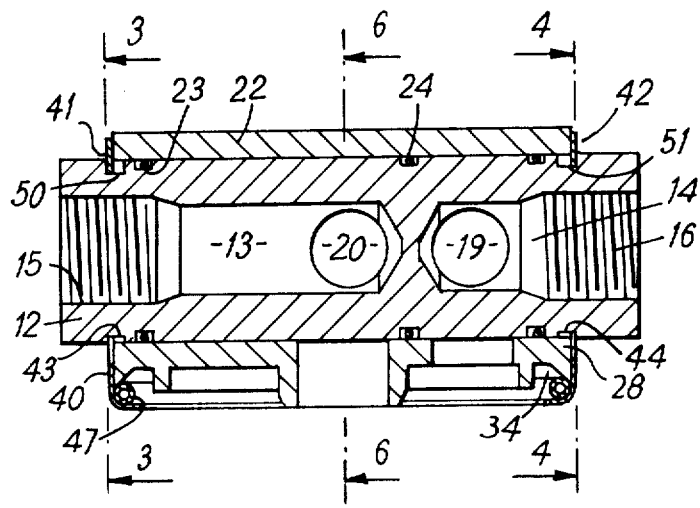
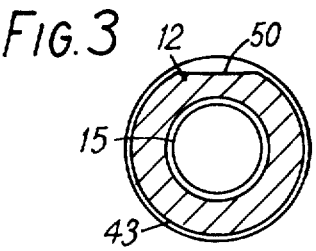
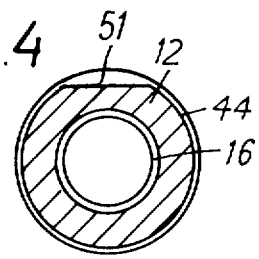
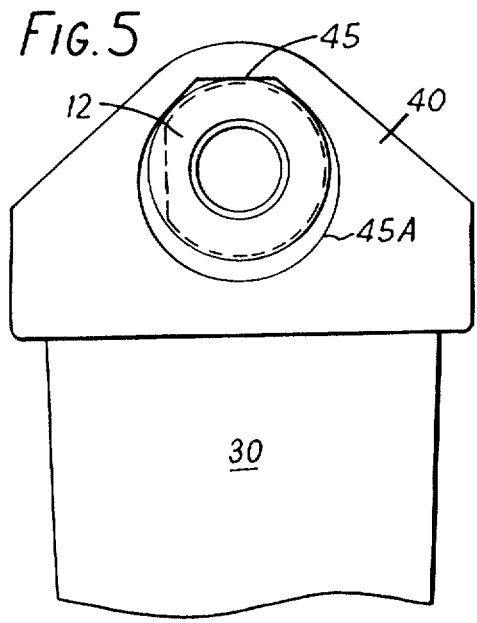
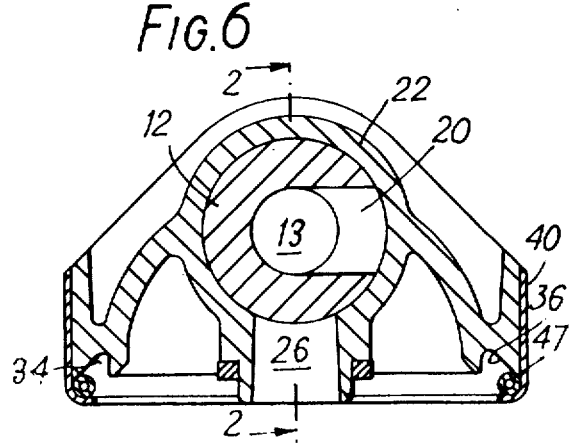

FLUID CONDITIONER HOUSINGS

This invention relates to fluid treatment apparatus of the kind comprising a pipe adaptor for insertion in a pipeline, the adaptor having pipe inlet and outlet channels to communicate with the pipe, a container for containing a fluid treatment device, said container extending at right angles to the axis of the pipe adaptor, said adaptor having inlet and outlet ports forming continuations of said pipe inlet and outlet channels, said ports leading to said container so that fluid will pass from the inlet channel through the container and thence to the outlet channel, a coupler sleeve surrounding the pipe adaptor, said coupler sleeve having ports providing communication between the pipe adaptor ports and said container, said coupler sleeve being rotatable on the pipe coupler to open and close communication between the pipe adaptor ports and the container.

According to the present invention an apparatus of this kind is provided, the said coupler sleeve having a groove surrounding the rim of the container, said container having a lip on its rim engaged in said groove, a fixing element surrounding said pipe adaptor, an expandable ring surrounding said rim under the lip, said fixing element engaging said ring to press it and the lip into the groove, said pipe adaptor having a cam engaging the fixing element whereby rotation of the coupler sleeve and fixing element about the pipe adaptor causes the fixing element to release the ring to a position which facilitates removal of the container.

The ring may be a garter spring, a split or segmented ring or a set of separate parts forming a ring or an elastomeric O-ring.

The lip on the container may be formed for example by a projecting rib, or a flared rim, or a groove.

The groove in the coupler sleeve may have a tapered surface at its part of larger radius engaged by the ring. When the coupler sleeve is in the servicing position the ring will be in its position of maximum relaxation and maximum diameter thus allowing free removal or insertion of the rim and lip of the container. When the coupler sleeve is moved to the operating position the fixing element forces the ring up the tapered surface to constrict it to a smaller diameter and force it against the lip of the container to create a firm mechanical and fluid tight engagement. A container can be installed or removed with a single hand grip and two movements.

The invention will now be further described by way of example with reference to the accompanying diagrammatic drawings wherein:

FIG. 2 shows a similar sectional view on a plane 90° offset from the plane of FIG. 1, but with the parts in the servicing position so that the container can be removed and replaced;

FIG. 3 is a sectional view on the line 3—3 on FIG. 1

FIG. 4 is a similar sectional view at the other end of the apparatus

FIG. 5 is an end view of the apparatus; FIG. 6 is a sectional view on the line 6—6 on FIG. 2.

Figure 1:
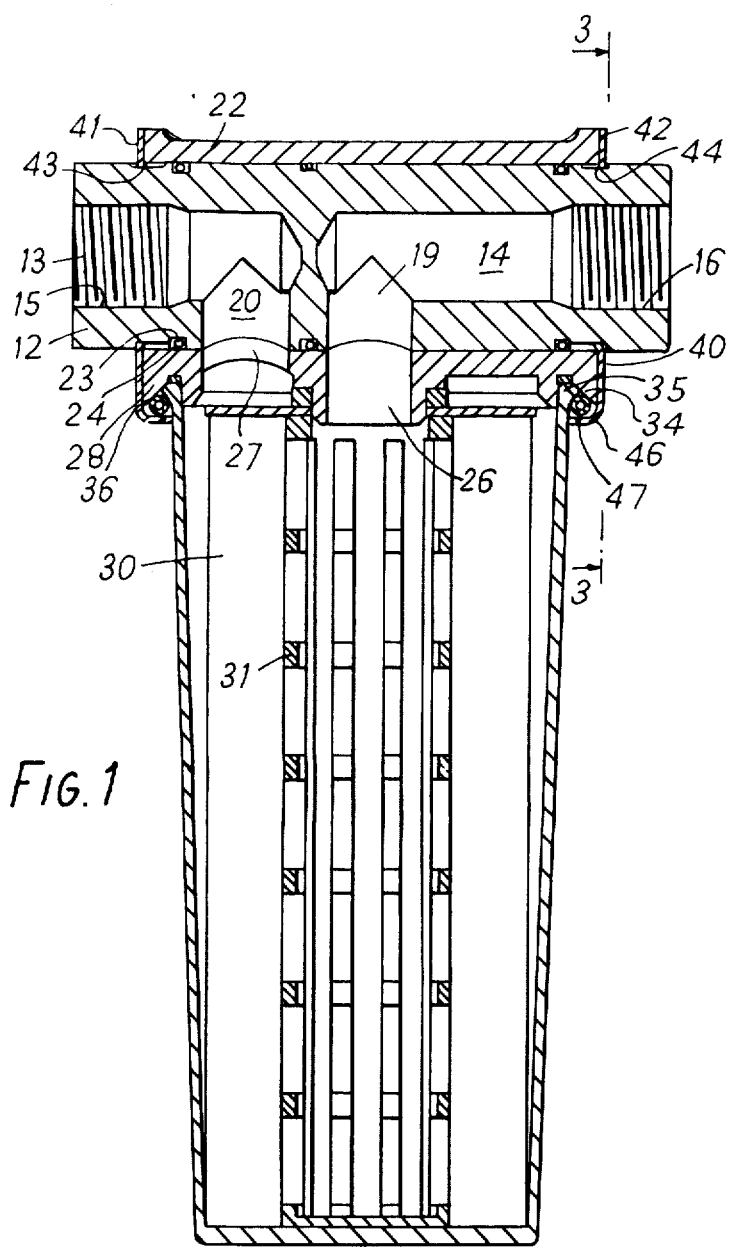
FIG. 1 shows a sectional view of a fluid treatment apparatus made in accordance with the invention with the parts in the relative positions which they occupy during normal operation.

A pipe adaptor 12 has an inlet channel 13 and an outlet channel 14. These channels have threads at 15, 16 for attachment to the ends of a pipe line into which it is to be inserted. The channels have extensions 19, 20 forming ports extending at right angles to the axis of the channels. Surrounding the pipe adaptor 12 is a coupler sleeve 22. The pipe adaptor is provided at appropriate intervals with grooves 23 containing packing rings 24. The coupler sleeve has ports 26, 27 adapted to mate with the ports 19, 20. The ports 26, 27 are formed in a flat part 28 of the coupler sleeve. A container 30 has its rim attached to the part 28. Within the container is a hollow fluid treatment element 31 the upper end of which closely surrounds the port 26. Fluid entering the channel 13 passes through the ports 20, 27 into the container around the treatment element 31 and passes through the walls of the element 31 which effects treatment of the fluid e.g. by filtering or absorption. The fluid then passes through ports 19, 26 to the outlet channel 14. The channels 13, 14 can be outlet and inlet channels respectively.

The part 28 has a circular groove 34 which receives the rim of the container which is formed with a rib or lip 35. The part of the groove of larger diameter is shaped as a tapering surface 36.

A fixing element 40 has rings 41, 42 which surround the pipe adaptor 12 seating in grooves 43, 44 in the adaptor. These rings also have flat chords 45 (FIG. 5) on their inner peripheries. The remainder 45A of these peripheries are circular with a clearance over the pipe adaptor 12. The element 40 has a circular flange 46 which engages under the groove 34. An elastic ring 47 is pressed by the flange 46 against the tapered frusto-conical surface 36 and against the lip 35 of the container to form a fluid tight engagement of the container with the part 28 of the coupler sleeve 22.

The grooves 43, 44 have flat cam surfaces 50, 51 forming chords of the pipe adaptor 12. When the container 30, together with the fixing element 40 and the coupler sleeve 22 are swung through 90° around the pipe adaptor the flat surfaces 45 mate with the cam surfaces 50, 51 and allow the fixing element to move radially of the pipe adaptor, urged by the elastic expansion of the ring, whereby the ring 47 is permitted to expand to its maximum diameter such that the lip 35 of the container can then be withdrawn through the ring 47 and similarly another container can be inserted. When the parts are restored to the positions of FIG. 1 the cam surfaces 50, 51 move the fixing element radially of the pipe adaptor to force the ring 47 up the tapered surface 36 to grip the lip of the container and hold it in fluid tight engagement with the part 28.

Figure 7:
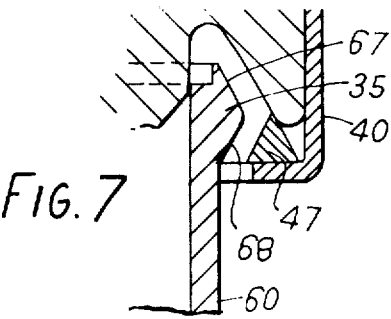
FIGS. 7 to 12 are sectional views of various shapes of ring and rim.

FIG. 7 shows a ring 47 of triangular section to engage an underneath taper 68 on the lip 35.

Figure 8:
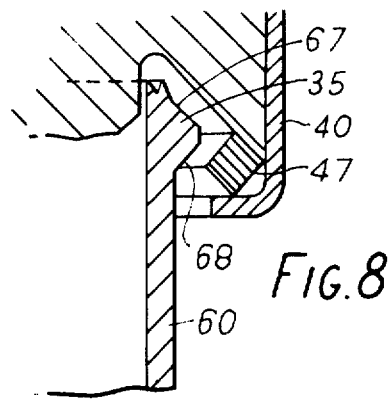
Figure 9:
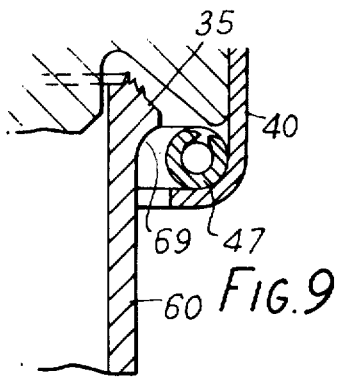

FIG. 8 shows a ring 47 of square section. FIG. 9 shows a ring of circular hollow section e.g. a steel spring, to engage a curved surface 69 on the lip 35.

The rim profile may thus control the unbalance of fluid pressure forces such that the surface 67 is strained outwards towards more efficient fluid tight engagement with the surface 36 thus effectively reinforcing sealing action with increasing pressure.

Figure 10:
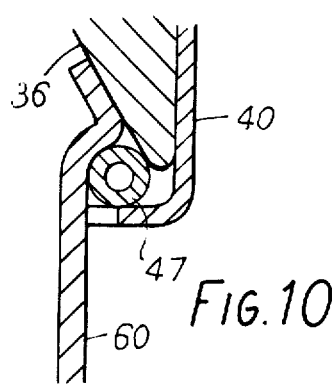

FIG. 10 shows a lip formed on the container 60 by bending the rim to form a curved part 70 as a seating for the ring 47 and an inclined edge 71 to seat against the frusto-conical surface 36.

Figure 11:
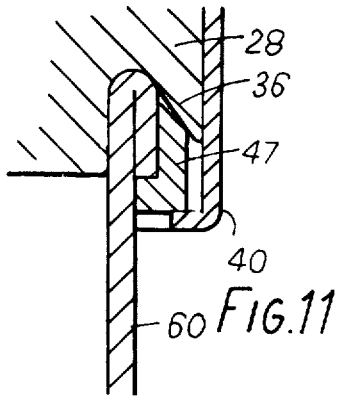

FIG. 11 shows a lip formed by bending the rim of the container 60 outwardly through 180°. The ring 47 in this case is shaped with a flange to engage under the lip and a frusto-conical edge to engage the surface 36.

Figure 12:
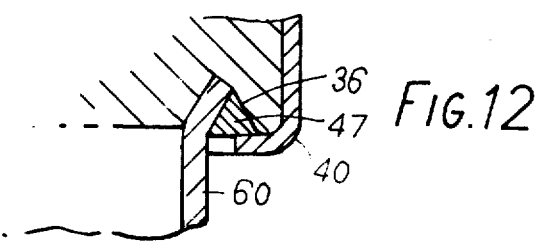

FIG. 12 shows a lip formed by bending the rim of the container 60 outwards to an angle corresponding to one surface a ring 47 of triangular section, another surface of which ring is at an angle corresponding to the surface 36.

I claim:

1. A fluid treatment apparatus comprising a pipe adaptor for insertion in a pipeline, the adaptor having pipe inlet and outlet channels to communicate with the pipe, a container for containing a fluid treatment device, said container extending at right angles to the axis of the pipe adaptor, said adaptor having inlet and outlet ports forming continuations of said pipe inlet and outlet channels, said ports leading to said container so that fluid will pass from the inlet channel through the container and thence to the outlet channel, a coupler sleeve surrounding the pipe adaptor, said coupler sleeve having ports providing communication between the pipe adaptor ports and said container, said coupler sleeve being rotatable on the pipe adaptor to open and close communication between the pipe adaptor ports and the container, said coupler sleeve having a groove surrounding the rim of the container, said container having a lip on its rim engaged in said groove, a fixing element surrounding said pipe adaptor, an expandable ring surrounding said rim under the lip, said fixing element engaging said ring to press it and the lip into the groove, said pipe adaptor having a cam surface engaging the fixing element including a part of said surface of reduced diameter whereby rotation of the coupler sleeve and fixing element about the pipe adaptor causes the fixing element to release the ring to a position which facilitates removal of the container.

2. A fluid treatment apparatus as claimed in claim 1 wherein the groove has a tapered surface at its part of larger radius engaged by said ring.

3. A fluid treatment apparatus as claimed in claim 1 wherein the cam surface is a chord of the pipe adaptor and the fixing element has a corresponding chord surface.

* * * * *